United States Patent [19]

Sutter

[11] 4,321,907
[45] Mar. 30, 1982

[54] CHARCOAL STARTER-BURNER

[76] Inventor: Richard A. Sutter, 7215 Greenway, University City, Mo. 63130

[21] Appl. No.: 100,517

[22] Filed: Dec. 5, 1979

[51] Int. Cl.³ .............................................. H47J 37/00
[52] U.S. Cl. .................................. 126/25 B; 220/300
[58] Field of Search ................ B65D/7/28; 232/43.1, 232/43.4; 126/25 B; 220/300

[56] References Cited

U.S. PATENT DOCUMENTS

| | | | |
|---|---|---|---|
| 1,341,592 | 5/1920 | Ruehle | 220/300 |
| 2,248,163 | 7/1941 | Dick et al. | 232/43.1 |
| 2,788,926 | 4/1957 | Morrison | 220/300 |
| 2,817,476 | 12/1957 | Mills, Jr. | 232/43.1 |
| 2,939,773 | 6/1960 | Rymer | 126/25 B |
| 3,116,704 | 1/1964 | Byars, Sr. et al. | 126/25 B |
| 3,167,040 | 1/1965 | Byars, Sr. et al. | 126/25 B |

Primary Examiner—Samuel Scott
Assistant Examiner—Wesley S. Ratliff, Jr.
Attorney, Agent, or Firm—Polster, Polster and Lucchesi

[57] ABSTRACT

A charcoal starter-burner of the general type exemplified by Byars and Johnson U.S. Pat. No. 3,116,704, has a perforate grate hinged at one side and spaced inwardly from the inner wall of a tubular housing, a leg connected to support the grate in charcoal retaining position and a foot connected to the lower end of the leg. The foot has a trigger part projecting beyond the periphery of the tubular housing and a latching arrangement for engaging and holding the trigger in leg-supporting position and for releasing the trigger to permit the foot to swing free of the bottom edge of the housing. The foot extends in paper-retaining position adjacent the lower end of the housing.

8 Claims, 8 Drawing Figures

CHARCOAL STARTER-BURNER

BACKGROUND OF THE INVENTION

Charcoal starters, by which charcoal used in outdoor grills and the like can be ignited by using newspaper or the like instead of flammable liquid starters, which are somewhat dangerous and expensive and may impart an undesirable flavor to foods, are well known, as exemplified by a U.S. patent to Byars et al, U.S. Pat. No. 3,116,704. The present invention is an improvement over the prior art devices in that it provides for positive retention of the charcoal grate when the starter is set on a base, and permits easy dumping while ensuring that the ignited charcoal is not dumped until the starter is lifted from the base upon which it has been set. In its preferred embodiment, it provides for means for inhibiting occlusion of openings in the grate by either paper or charcoal. It is self-contained, requiring no latching rods or other loose pieces. It can be placed on a solid base or on the grate of barbecue grill, or it can serve as a brazier or as a stove without smothering the flame.

SUMMARY OF THE INVENTION

In accordance with this invention, generally stated, a charcoal starter-burner is provided, with a tall open-ended tubular housing, and a perforate grate hinged at one side, defining an upper, charcoal receiving chamber and a lower, paper receiving chamber. The grate is spaced inwardly from the inner wall of the housing. A leg is connected to support the grate in charcoal-retaining position. A foot, connected to the lower end of the leg has a trigger part projecting beyond the periphery of the tubular housing, which, in the preferred embodiment, is received within and biased into latching position within an inverted J-slot the stem of which extends through the bottom edge of the housing. The foot is adjacent the lower edge of the housing, so that when the starter is resting on a grate, or an imperforate base, such as the ground, the grate can not swing down. The foot is so constructed as to serve as a paper-retaining device. The grate hinge, leg and foot are so constructed and arranged as to permit the foot to swing clear of the bottom edge of the tubular housing when the trigger is released and the starter is lifted from the base.

In the preferred embodiment, tabs adjacent the perforations in the grate inhibit occlusion of the perforations.

DESCRIPTION OF THE PREFERRED EMBODIMENT

Figure 1:
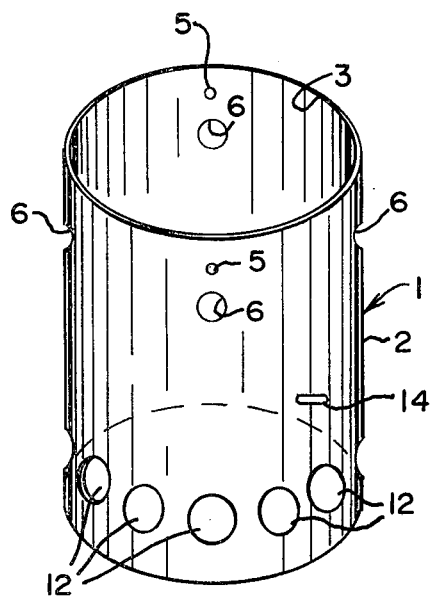
FIG. 1 is a view in perspective of one embodiment of charcoal starter-burner of this invention.

Referring now to the drawing for one illustrative embodiment of charcoal starter-burner of this invention, reference numeral 1 indicates the assembled starter-burner device. The burner 1 includes a tubular housing 2, which, in this embodiment, is cylindrical. The housing 2 has an open top defined by an upper edge 3, and an open bottom defined by a lower edge 4. Below the upper edge, the wall of the housing 2 has two, diametrically opposed, bail receiving openings 5, below which are larger vent openings 6, shown as being four in number and arranged symmetrically. Above the lower edge 4 are twelve draft holes 12 symmetrically arranged with their centers in a plane perpendicular to the long axis of the cylindrical housing 2.

Axially between the vent holes 6 and the draft holes 12, aligned chordally, are hingepin or rod holes 14.

In this embodiment, an inverted J-slot 16, a stem 17 of which extends through the lower edge 4 of the housing, has a crook portion 18.

Figure 2:
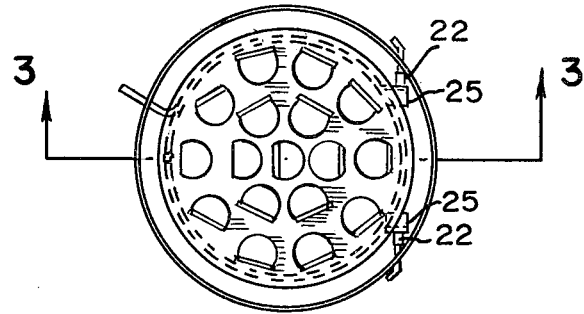
FIG. 2 is a top plan view.
Figure 5:
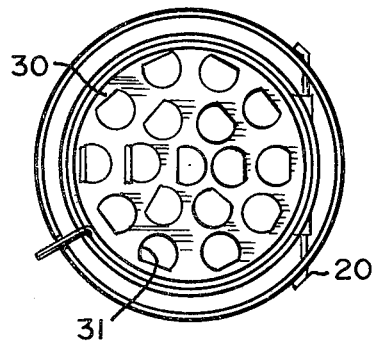
FIG. 5 is a bottom plan view.

A hinge rod 20 extends through the holes 14, and is prevented from coming out either by bending the ends, as shown in FIGS. 1, 2 and 5, or by any other suitable way as by the use of Tinnerman clips or other common fasteners. A pair of spacing sleeves 22 are mounted on the rod outboard of a pair of hinge straps 25. In this embodiment, the hinge straps 25 are L-shaped, with a depending leg portion 26 and a transverse fastening section 27. The section 27 is welded or otherwise secured to the underside of a grate 30, which in this embodiment is a flat, perforate plate. The depending leg 26 of each hinge strap 25 has an elongated, somewhat eliptical hole 28 in it, through which the rod 20 extends.

The grate 30 has opening 31 through it. In the embodiment shown, tabs 32 are lanced from the plate forming the grate to project upwardly at the edge of some of the holes 31, while other tabs 33 are lanced downwardly to form others of the holes 31.

A support assembly 40 is, in this embodiment, made of a single metal rod bent to form a support ring 41, a support leg 43, a foot 45, and a trigger 47. The support ring 41 is shaped complementarily to the grate 30, but is smaller, and is welded or otherwise secured to the underside of the grate. The leg 43 is, as shown in FIG. 3, opposite the rod 20 on a line perpendicular to the rod, so as to support the edge of the grate remote from the hinge axis.

Figure 3:
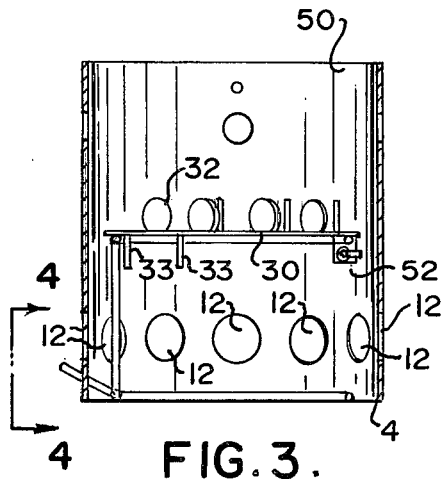
FIG. 3 is a sectional view taken along the line 3—3 of FIG. 2.
Figure 6:
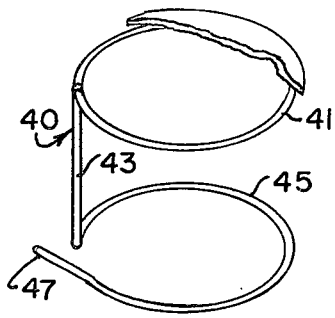
FIG. 6 is a view in perspective, partly broken away, of the trigger, foot, leg, grate support and grate.
Figure 7:
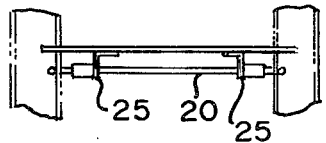
FIG. 7 is a fragmentary view showing the grate hinge arrangement of this embodiment.
Figure 8:
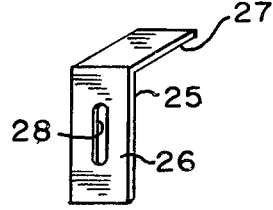
FIG. 8 is a detail, somewhat enlarged, of a hinge strap.

The foot 45, at the lower end of the leg 43, is formed into an incomplete circle, and, at its free end, has a trigger 47 projecting substantially radially, but at an angle from the horizontal, as shown particularly in FIGS. 3 and 6. The foot 45 is sufficiently flexible to bias the trigger 47 in a direction toward the leg 43, but to permit the trigger 47 to be displaced manually in a direction away from the leg 43.

Figure 4:
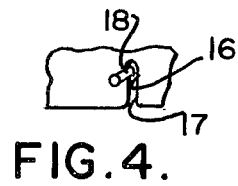
FIG. 4 is a fragmentary detail view in the direction shown at 4—4 in FIG. 3.

The trigger 47 in the condition shown in FIG. 3, slides in the J-slot 16, and is biased to the position shown in FIG. 4, within the crook 18.

As can be seen from FIG. 3, the grate 30 divides the housing into an upper charcoal chamber 50 and a lower, ignition chamber 52. The grate 30 extends near but at a substantial distance from the inner wall of the housing. The clearance between the grate and the wall is close enough to preclude the charcoal's falling through the space, but far enough to permit the grate to swing downwardly about the rod 20. The foot 45 is preferably spaced farther from the inner wall of the housing than the grate is, but close enough to leave a substantial opening through which crumpled newspaper can be inserted. The foot 45 serves to retain the newspaper, which tends to expand to fill the chamber.

Merely by way of example, and not by way of limitation, the housing can be 12" tall and 8" in diameter. The upper holes 6 can be ⅜" in diameter, and the lower holes 12, 1⅛" in diameter. The grate 30 can be circular, 7½" in diameter, with a thickness of 1/16". The space between the inner wall and the grate can therefore be ¼". The grate is so positioned as to make the upper chamber 50 approximately 7½" deep, and the lower chamber approximately 4½" high. The pivot rod can be of 3/16" stock, as can the support assembly 40. The supporting ring 41 can be 6⅛" in diameter, the leg 4½" long, and the foot 6" in diameter.

The holes in the grate can be 1" in diameter in the unobstructed direction, and the tabs 32 and 33 project approximately ⅜". The J-slot 16 can be ¼" wide with the stem 1" high and the crook approximately ½" long. The trigger extends 1" beyond the outside surface of the housing. The eliptical hole in the hinge strap can be on the order of ⅝" long, providing ⅜" to 7/16" travel for the grate with respect to the hinge rod.

The assembly of the device is self-evident. In operation, the trigger 47 is moved laterally in a direction away from the leg 43 to permit its entry into the slot 17, and then released at the top of the slot to permit the bias of the foot 45 to move the trigger into the crook 18. Crumpled newspaper, of which two full sheets have been found to be sufficient, are shoved through the opening in the foot 45 into the ignition chamber 52. Charcoal briquettes are put into the upper chamber, where they rest on tabs 32. The charcoal need not be in briquette form. A suitable handle, which can be a long bail with inwardly projecting ends received in the holes 5, can be used, and the entire container can be picked up and placed on whatever base is desired, such as the grate of a grill, the imperforate bottom of a kettle or the ground. The paper is then lighted through one of the bottom holes.

It has been found that the charcoal ignites quickly and uniformly, sufficiently so that it may be dumped, ready to use, in ten to fifteen minutes or less.

When the charcoal is to be dumped, the trigger is moved manually out of the crook and into the stem, and the housing is lifted. The foot swings clear of the bottom edge of the housing, the grate swings down around the hinge rod, and the charcoal is dumped through the bottom of the housing.

If it is desired to use the device as a brazier or stove, the charcoal is left in place, and either food is grilled over thd coals, or a pan is placed on top. In the latter case, the flow of air out the vent holes 6 is sufficient to maintain combustion of the briquettes.

Numerous variations in the construction of the charcoal starter-burner of this invention, within the scope of the appended claims, will occur to those skilled in the art in the light of the foregoing disclosure. Merely by way of illustration, the draft or vent holes, or both, can be made as crenels through the edges of the housing. The foot can be made in the form of a solid plate, with a flange or rim extending around the outside of the housing so as to confine any ash or embers, in the event that the device is to be used as a burner, in which case, it is desirable to make the leg of such length as to permit the grate to be lifted by the foot when the device is set on a base, so that the hinge slot can provide clearance for the foot when the device is lifted. The movement of the grate relative to the housing in an axial direction can be accomplished by fixing the hinge rod to the grate and making the hinge rod holes in the housing vertically elongated. The grate can be made without tabs, although the tabs serve a useful function, or the tabs can be provided only in the upwardly or only in the downwardly projecting direction. The housing may be made in other shapes, and differently proportioned, in which case the grate and foot will be shaped complementarily. Other combustible material can, of course, be used instead of paper, such as excelsior or other kindling material. For loose kindling material, the imperforate foot may be preferred, the draft holes providing ample air for combustion. The J-slot crook can tend in the other direction, provided that the bias of the foot is reversed, to move the trigger away from the foot rather than toward it. Other latching means can be employed, although the J-slot has the advantage of extreme simplicity. The hinge straps can be made integral with the grate. They can be made U-shaped, or provided with integral projections or bulbous areas to serve the double function of hinge strap and spacer. Even the leg or leg and foot can be made integrally with the grate. The foot can be differently configured from either an imperforate pan or the ring of the preferred embodiment, extending diametrically from the bottom of the leg, for example, although the preferred embodiment has advantages in stability and in not getting caught in the grate. The hinge rod construction of the preferred embodiment has advantages of simplicity, but other hinge arrangements can be used. As has been indicated, these are merely illustrative.

Having thus described the invention, what is claimed and desired to be secured by Letters Patent is:

1. In a charcoal starter-burner having a tall, open ended, tubular housing, a grate intermediate its ends defining in one position of said grate, an upper, charcoal receiving chamber and a lower, ignition chamber, and holes through its perimeter at its lower end, the improvement comprising a shaft mounted chordally in said housing, a perforate grate hinged at one side to said shaft to swing about the axis of said shaft, and means for permitting relative movement of said grate axially of said housing at said axis, said grate being spaced inwardly from the inner wall of said housing, a leg connected to support said grate in charcoal-retaining position and a foot, adjacent the lower edge of said housing, connected to the lower end of said leg, said foot having a trigger part projecting beyond the periphery of said tubular housing, and latch means on said housing for engaging and holding said trigger in leg supporting position and for releasing said trigger in another position, said foot having a part extending transversely of said housing in the direction of the hinge side of said grate and substantially parallel with said grate in paper-retaining position adjacent the lower end of said housing, and said foot being arranged for swinging free of the bottom edge of said housing when the said trigger is released.

2. The starter-burner of claim 1 wherein the trigger is a finger and the latch means is an inverted J-slot the stem of which opens through the bottom edge of said housing.

3. The starter-burner of claim 1 wherein the foot extends along but spaced from the inside surface of said housing, and the leg is spaced from and at the opposite side of the grate from the hinge axis of the grate.

4. The starter-burner of claim 3 wherein the leg and foot are integral, formed of continuous rod, and the trigger is a free end part of the rod at the foot.

5. The starter-burner of claim 4 wherein the grate is secured to a grate support member formed as part of the rod at and forming the upper end of the leg.

6. The starter-burner of claim 5 wherein the grate support member is formed complementarily to the outline of and inboard of the periphery of the grate.

7. The starter-burner of claim 4 wherein the foot is shaped complementarily to the housing and extends at least part way around but spaced from the inner wall of said housing.

8. The improvement of claim 1 wherein said means for permitting relative movement are hinge straps each with an axially directed elongated hole through which said shaft extends to permit movement of the grate axially of the housing.

* * * * *